(12) United States Patent
Weber

(10) Patent No.: US 12,506,887 B2
(45) Date of Patent: Dec. 23, 2025

(54) FIXED RATE INTRAFRAME COMPRESSION AND DECOMPRESSION OF VIDEO BASED ON VISUAL QUALITY

(71) Applicant: Avid Technology, Inc., Burlington, MA (US)

(72) Inventor: Markus Weber, Woerth (DE)

(73) Assignee: Avid Technology, Inc., Burlington, MA (US)

( * ) Notice: Subject to any disclaimer, the term of this patent is extended or adjusted under 35 U.S.C. 154(b) by 0 days.

(21) Appl. No.: 18/940,335

(22) Filed: Nov. 7, 2024

(65) Prior Publication Data

US 2025/0324071 A1    Oct. 16, 2025

Related U.S. Application Data

(60) Provisional application No. 63/633,071, filed on Apr. 12, 2024.

(51) Int. Cl.
| | |
|---|---|
| *H04N 19/30* | (2014.01) |
| *H04N 19/119* | (2014.01) |
| *H04N 19/124* | (2014.01) |
| *H04N 19/136* | (2014.01) |
| *H04N 19/184* | (2014.01) |
| *H04N 19/48* | (2014.01) |
| *H04N 19/625* | (2014.01) |

(52) U.S. Cl.
CPC .......... *H04N 19/30* (2014.11); *H04N 19/119* (2014.11); *H04N 19/124* (2014.11); *H04N 19/136* (2014.11); *H04N 19/184* (2014.11); *H04N 19/48* (2014.11); *H04N 19/625* (2014.11)

(58) Field of Classification Search
CPC .... H04N 19/30; H04N 19/119; H04N 19/124; H04N 19/136; H04N 19/184; H04N 19/48; H04N 19/625
See application file for complete search history.

(56) References Cited

U.S. PATENT DOCUMENTS

2004/0196903 A1* 10/2004 Kottke ................. H04N 19/124 375/240.18

* cited by examiner

*Primary Examiner* — James M Pontius
(74) *Attorney, Agent, or Firm* — Oliver Strimpel

(57) ABSTRACT

DCT-based methods for fixed bit rate, intraframe compression of video are based on the visual quality of the resulting decompressed imagery. In general, this involves assigning an initial bit budget per macroblock of a given video frame, resulting in degrees of compression, i.e., quantization scale factors, that vary among the macroblocks according to their complexity. The scale factors are then adjusted while maintaining the overall frame bit budget to reduce the visibility of artifacts in the decompressed frame. The adjustments may include increasing scale factors for simple macroblocks and reducing scale factors for complex blocks. As compared to traditional DCT-based compression schemes, the described methods may reduce the visibility of compression-related artifacts both in complex and in simple portions of the frame.

5 Claims, 5 Drawing Sheets

FIXED RATE INTRAFRAME COMPRESSION AND DECOMPRESSION OF VIDEO BASED ON VISUAL QUALITY

BACKGROUND

Digital data representing motion video is voluminous, and increases as the resolution of video images increases, from SD to HD to 4K/UHD and to 8K/UHD2. Each step multiplies the number of pixels by a factor of four. However, when video is being edited, it is not necessary for the editor to view an image that has the full resolution of the original or finally rendered imagery. In most circumstances, an HD image provides enough visual quality to guide an editor during the editing process. Using such lower-resolution imagery, referred to as a proxy, for editing purposes avoids consuming unnecessary computing resources and bandwidth, as video sources are usually shared from a central server farm and not copied locally. Reduced bandwidth requirements means that more editing clients can be supported with a given infrastructure, increasing cost effectiveness. Thus, with the higher levels of compression required to generate a proxy from the increasingly voluminous original media while still meeting available bandwidth (bitrate) constraints, there is an increased need for methods of generating visually acceptable proxies.

Maximal visual quality in relation to bitrate is generally achieved using interframe compression techniques, such as Long Group of Pictures (GOP) compression/decompression (codec) schemes. These can typically provide the same quality as equivalent-quality single frame (intraframe) compression methods at about 10% of the bitrate cost. However, interframe codecs come with severe processing overhead, especially when seeking individual frames and moving rapidly between different locations-both of which are dominant requirements during the editing process. GOP codecs cannot match the performance of intraframe codecs with respect to these requirements.

Various intraframe compression techniques have been used to generate proxies. Commonly used techniques employ variations of the (still image) JPEG algorithm, which is based on a combination of a 2D discrete cosine transform (DCT), a tunable quantization step (lossy), and a final Variable Length Coding (VLC) stage.

Still-image codecs like JPEG need to cover only a single image. While one of their objectives is to preserve storage space, the image quality (quantization error) is considered the primary factor driving the compression control, accepting the resulting (reduced) frame size as a given.

In a video, the image content frequently varies widely in complexity and detail from frame to frame over time. Applying the quality-focused JPEG approach to video without modification keeps the quality level the same across subsequent frames and results in a bitstream with a widely varying bitrate, e.g., bytes per second, when transmitted. However, as video relies on a constant number of images being transmitted regularly through a transmission channel of limited bandwidth (maximum bitrate capacity), this would lead to one of two possible consequences: (1) If the compressed size of a frame is too large, the transmission would not complete within the time slice available for the transmission of the frame to keep up the regular image sequence, resulting in staggering display, or (2) The quality of the video may have to be greatly reduced in order that the frame(s) still fit into the available bit budget for a time slice.

To avoid these problems, a rate controller needs to be devised that controls the compressed size of the frames over time, either achieving a constant bitrate (CBR), where each frame has exactly the same size, or a variable bitrate around a long-term constant average bitrate (VBR). The latter is only possible if the receiver allows for a buffered, time-delayed decoding to cover frame size overshoots.

One fixed-bitrate intraframe video codec in wide use is the Avid DNx codec, developed by Avid Technology, Inc. of Burlington, Massachusetts, which is described in U.S. Pat. Nos. 7,403,561, 7,433,519, 7,729,423, 7,916,363, and 8,154,776, which are wholly incorporated herein by reference. Avid DNx supports both CBR and VBR coding and uses a rate controller focused on minimizing the mathematical error introduced by the compression at relatively moderate compression ratios (mezzanine or archive quality). As discussed below, this leads to some unjustified assumptions which, when applied to high compression ratios, adversely affect the visual image quality and degrade its utility for low-bitrate proxy workflows during post-production.

There is therefore a need for a compression scheme for intraframe compression of video that is able to optimize visual quality of highly compressed video proxies to support the video editing process while satisfying bandwidth requirements and computational constraints. This need is further emphasized by the fact that the typical bandwidth available for the distribution of video proxies has not increased in proportion to the size and dimensions (4K, 8K) of the original video images.

SUMMARY

In general, a method for fixed bit rate, intraframe compression of video focuses on the resulting visual quality rather than measures of the degree of compression.

In general, in one aspect, a method for fixed bit rate, intraframe compression of video, including a sequence of images, comprising, for each image comprises: segmenting the image into n portions, wherein compression parameters are individually adjustable for each of the n portions; transforming each of the portions of the image to generate frequency domain coefficients for each of the portions; selecting a stored quantization matrix for the image based on a desired bit rate for the compressed video; determining an initial bit budget per transformed portion of the image that is equal to a bit budget for the image within the compressed video divided by n; for each transformed portion, determining an initial scale factor that is the smallest scale factor that, when applied to the frequency domain coefficients together with the quantization matrix, results in a bit size of the transformed portion that is equal to or less than the initial bit budget per transformed portion; and generating a bitstream representing the compressed image by: for each transformed portion, scaling the portion's frequency domain coefficients by applying to the portion the initial scale factor determined for that portion together with the quantization matrix; and arranging the scaled frequency domain coefficients in a predetermined sequence and applying variable length coding to the sequence of scaled frequency domain coefficients.

Various embodiments include one or more of the following features. Ranking the transformed portions in order of their initial scale factors and determining an average of the initial scale factors; proceeding in order of increasing initial scale factor, adjusting downward the initial scale factors of a plurality of transformed portions having initial scale factors greater than the average initial scale factor, wherein the amount of adjustment is a diminishing fraction of a difference between a given transformed portion's initial scale factor and the average initial scale factor; and terminating the adjustment of initial scale factors when adjusting an additional transformed portion would result in a sum of bit sizes of the scaled transformed portions of the image exceeding a bit budget for the image within the compressed video. Prior to adjusting downward the initial scale factors of the plurality of transformed portions having initial scale factors greater than the average initial scale factor, for each portion having an initial scale factor below a threshold scale factor, adjusting upward the initial scale factor of the portion, wherein the threshold scale factor is based on the average initial scale factor and a standard deviation of the initial scale factors.

In general, in another aspect, a computer program product comprises: a non-transitory computer-readable medium with computer-readable instructions encoded thereon, wherein the computer-readable instructions, when processed by a processing device instruct the processing device to perform a method for fixed bit rate, intraframe compression of video, including a sequence of images, the method comprising, for each image: segmenting the image into n portions, wherein compression parameters are individually adjustable for each of the n portions; transforming each of the portions of the image to generate frequency domain coefficients for each of the portions; selecting a stored quantization matrix for the image based on a desired bit rate for the compressed video; determining an initial bit budget per transformed portion of the image that is equal to a bit budget for the image within the compressed video divided by n; for each transformed portion, determining an initial scale factor that is the smallest scale factor that, when applied to the frequency domain coefficients together with the quantization matrix, results in a bit size of the transformed portion that is equal to or less than the initial bit budget per transformed portion; and generating a bitstream representing the compressed image by: for each transformed portion, scaling the portion's frequency domain coefficients by applying to the portion the initial scale factor determined for that portion together with the quantization matrix; and arranging the scaled frequency domain coefficients in a predetermined sequence and applying variable length coding to the sequence of scaled frequency domain coefficients.

In general, in a further aspect, a system comprises a memory for storing computer-readable instructions and a processor connected to the memory, wherein the processor, when executing the computer-readable instructions, causes the system to perform a method for fixed bit rate, intraframe compression of video, including a sequence of images, the method comprising, for each image: segmenting the image into n portions, wherein compression parameters are individually adjustable for each of the n portions; transforming each of the portions of the image to generate frequency domain coefficients for each of the portions; selecting a stored quantization matrix for the image based on a desired bit rate for the compressed video; determining an initial bit budget per transformed portion of the image that is equal to a bit budget for the image within the compressed video divided by n; for each transformed portion, determining an initial scale factor that is the smallest scale factor that, when applied to the frequency domain coefficients together with the quantization matrix, results in a bit size of the transformed portion that is equal to or less than the initial bit budget per transformed portion; and generating a bitstream representing the compressed image by: for each transformed portion, scaling the portion's frequency domain coefficients by applying to the portion the initial scale factor determined for that portion together with the quantization matrix; and arranging the scaled frequency domain coefficients in a predetermined sequence and applying variable length coding to the sequence of scaled frequency domain coefficients.

DETAILED DESCRIPTION

We describe herein a video rate controller, principally designed for low bitrates, which approaches the rate control problem from a fundamentally different starting point than the traditional approach. It focuses on a human-centric approach that accepts the general presence of coding artifacts in the decoded frame and attempts to minimize artifact visibility instead of trying to minimize the overall mathematical error of the encoded frame. In the following we describe how the traditional rate controllers work, point out the pitfalls of using them for high compression ratios, and then describe a human-centric video rate controller that addresses these pitfalls.

Figure 1:
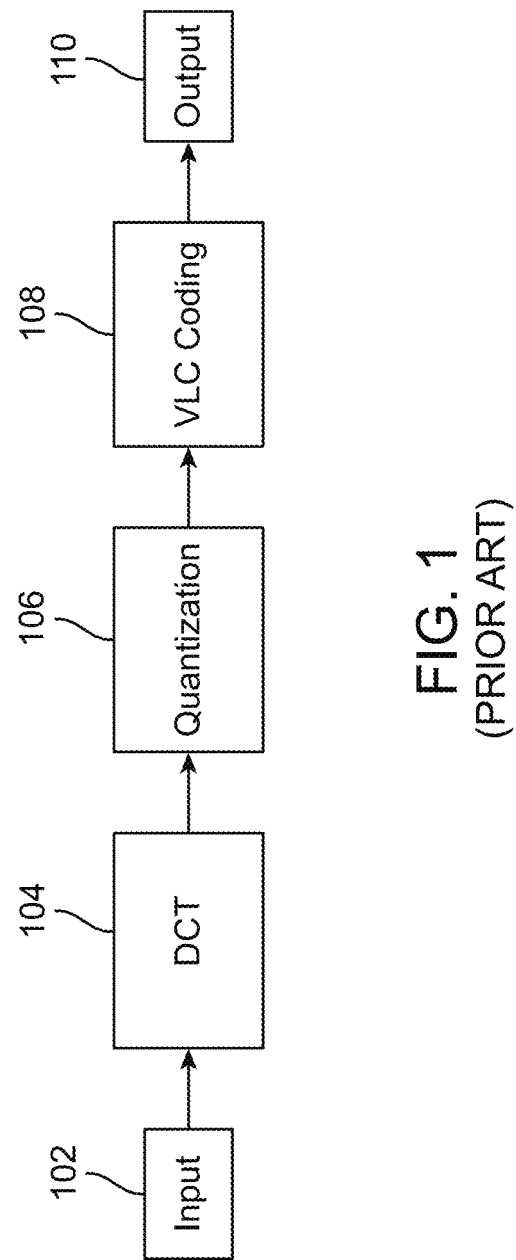
FIG. 1 is a high-level flow diagram of the main steps involved in digital image compression using discrete cosine transforms.
Figure 2:
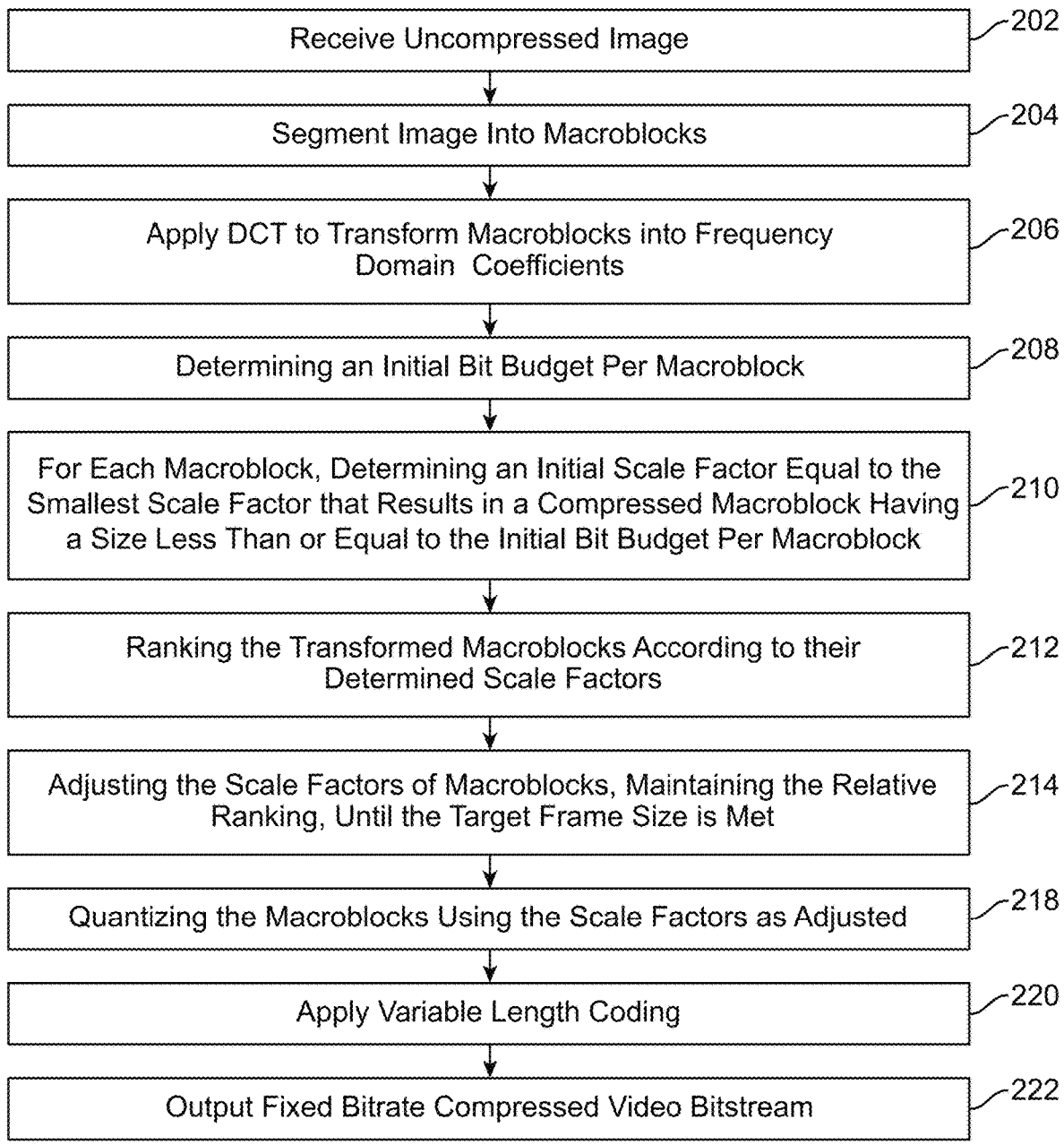
FIG. 2 is a high-level flow diagram of the steps involved in the described digital image compression methods based on visual quality of the result.

FIG. 1 is a high-level flow diagram of the main steps involved in digital image compression using discrete cosine transforms. Uncompressed image input 102 is subjected to DCT 104. The DCTs used in the codecs discussed herein operate on 8×8 pixel blocks. Through the DCT, the spatial components are transformed into an equivalent set of 8×8 floating point frequency coefficients. This process is lossless, as, if left untouched and then subjected to an inverse DCT, the original 8×8 pixels are recovered. For original pixel values having a bit depth b, the resulting floating point frequency components cover a floating point range equal to integer numbers of bit depth b+3. The floating point components can therefore be rounded to their nearest integer values without the rounding seriously impacting the perfect reconstruction so that for practical purposes the integer representation is effectively lossless. Even without any further processing, the frequency components could then be subjected to VLC coding schema 108, which exploits general characteristics associated with the coefficient data, yielding some mild compression compared to the original. The bitrate or quality tuning (discussed below) associated with DCT-based compressions serves to amplify these characteristics to yield a smaller VLC-coded size.

The VLC-coded size of a DCT block cannot be accurately predicted mathematically. To determine the resulting bit cost of a DCT block, the VLC coding must be executed at least to the level of determining the sum of resulting code lengths. Efficiently determining this size is a central problem of the existing rate controllers, as it has to be done very often during the rate control process.

The tuning of the compression is performed in quantization step 106. The parameter that controls the tuning is the scale factor q used to divide the frequency coefficients X(u, v), as follows $$\hat{X}(u, v) = \left\lfloor \frac{X(u, v)}{q} \right\rfloor$$

where $\lfloor \ldots \rfloor$ denotes truncation to the next lower integer. An approximation of the original values X(u, v) can be reconstructed as $$\tilde{X}(u, v) = q \hat{X}(u, v)$$

with an error $\varepsilon(q, u, v) = |\tilde{X}(u, v) - X(u, v)|$ in the range [0, q]. The effect of this division is to reduce the coefficients to multiples of the quantization step size q. This has a two-fold effect: First, it makes the residual components $\hat{X}(u, v)$ smaller, which generally enables better coding efficiency in VLC encoding step 108; and second, it converts small $\hat{X}(u, v)$ components into zeroes, which can then be encoded extremely efficiently via a run-length coding scheme, i.e., VLC step 108. In general, it is the latter aspect of the quantization that has the greatest effect. By increasing the value of q, more of the coefficients are converted into zeroes, lengthening the run length of zeroes and thus dramatically reducing the bit cost required to store the residual values $\hat{X}(u, v)$. Following VLC step 108, the compressed image data is output (110).

In the original JPEG compression algorithm, a single quantization factor q is used for the entire image. The rationale for this is that it keeps the error $\varepsilon(u, v)$ constant, which is the desired characteristic of the original JPEG algorithm. It prioritizes quality and allows the resulting compressed bit count to vary, making it unsuitable for video. In short, the JPEG algorithm follows the logical relationship $$\text{Quality} \xrightarrow{\text{drives}} \text{Size}.$$

The DCT-based video codecs generally follow the same paradigm because they were primarily designed for archiving media in a mezzanine format. For these, mathematically-defined quality is the primary objective, subject to the additional CBR or VBR size constraints. The easiest way to control the bitrate in an I-frame codec would be to increase the quantization parameter q until the resulting size falls below the targeted compressed frame size. A single q applied across an entire frame, paired with constant (CBR) compressed frame size will lead large and clearly visible quality variations across successive frames. Using an average (VBR) compressed frame size over multiple frames will avoid these (fast) quality variations (perceived as "flutter") but will force the image quality to degrade significantly over longer time spans. It will also make the rate control harder, introducing a significant encoding delay of multiple frames, as the encoder may have to encode the frames multiple times in succession to achieve the desired temporal average.

In order to better control the bitrate, video codecs need an additional per frame control lever to tweak the bitrate that allows them to overcome the flutter problem while still being able to control the overall compressed frame size. They do this by segmenting the overall image into smaller sections called slices, for which the quantization parameter q can be adjusted separately. Avid DNx takes this to extremes by allowing the adjustment of q for each 16×16 pixel block known as a macroblock (MB). Macroblocks represent the smallest entity for which all components of a sub-sampled video signal (4:2:2 or 4:2:0) can be organized into 8×8 DCT blocks.

At a high level, traditional rate controllers such as Avid DNx perform the following steps: (1) Select a uniform q, which results in a frame size that is a rough approximation of the target frame size; and (2) Fine-tune the q value for the individual macroblocks (up or down from the initially assigned uniform value) to approximate the compressed target frame size more closely while simultaneously minimizing the overall quantization error $E = \Sigma\varepsilon(q, u, v)$. This is known as the Rate-Distortion Optimization (RDO) approach.

To simplify the computation of the overall error E, the relationship $\varepsilon(q, u, v) \leq q$ can be exploited by approximating $\varepsilon(q, u, v)$ with the worst-case value q. The total error contribution of a macroblock is then approximately $\varepsilon_{MB}(q) = q \cdot 64 \cdot N_{DCT}$, where $N_{DCT}$ is the number of DCT blocks within a macroblock and 64 is the number of coefficients per DCT block. As the latter two factors are uniformly constant throughout the frame, the rate controller can simply use $\Sigma q$ as the quantity representing the overall error for control purposes.

As mentioned above, the resulting VLC-coded size of a MB cannot be predicted accurately as the frame-size dependency on q is determined by the actual coefficient values in the MB. As q is changed, the resulting changes in MB size are highly non-linear and generally abrupt, as multiple (integer) coefficient values may turn to zero or become non-zero, depending on which way q is adjusted. However, the MB size bears the following qualitative relationships to q: (A) The MB size decreases as q is increased; (B) Blocks with many significantly non-zero coefficients, i.e., visually complex blocks, quality-wise react only slowly to changes of q while the size changes involved may be large; and (C) Blocks with relatively few significantly non-zero coefficients, i.e., simple blocks, typically react very quickly to changes in q (both quality and size) for small q values and then very slowly as q is further increased. For these blocks, the overall size change, no matter how q is varied, is always small.

As a traditional rate controller tries to minimize the overall error, and because the error contribution of a MB depends only on q and not on the complexity of the MB, the rate controller mostly focuses on adjusting the parameter q where it has the most effect on the compressed MB size. This will be the complex blocks, leaving the simple blocks alone. Once it starts meeting the bitrate it rebalances the q distribution between simple and complex blocks to reach the minimum of $\Sigma q$. However, this later stage will not affect the quantization of the simple blocks because a change of $q \rightarrow q-1$ in a complex block would have to be compensated either by changes of $q \rightarrow q+1$ in many simply blocks, or a change of $q \rightarrow q+x$ in a few blocks. In either case, the result on the $\Sigma q$ would be very negative, as it would always lead to an effective increase in compressed size. Consequently, the rate controller essentially redistributes the quantization only between blocks of about the same complexity, i.e., moving one block to $q \rightarrow q+1$ and compensating this with moving another block to $q \rightarrow q-1$, with the only effect being a slightly better fit to the target bitrate. This is consistent with the observation that complex blocks contain a lot of detail, while simple blocks are relatively flat. When the aim is to stay as close as possible to the original quality, the rate controller naturally focuses on complex blocks as these are the major contributors to a frame's compressed size.

The traditional approach suffers from two fundamental pitfalls, which become manifest at high compression ratios. The first concerns the traditional controller's focus on complex blocks at the expense of simple blocks, as discussed above. At low compression ratios, reaching the target bitrate is not very difficult and the number of q-induced zeroes in the coefficients is small. The compression stems mostly from the value reduction of the amplitudes, replacing value $\hat{X}(u, v)$ with smaller non-zero values $\hat{X}(u, v)/q$. Under these conditions, most of the macroblocks are assigned a single dominant q value, with a very small scatter region around it. The q value variations have a largely negligible effect on the size of the macroblocks and little impact on the quality of the reconstructed result (small errors) but affect how close the algorithm gets to the desired target bitrate. At high compression ratios, the generation of zeroes in the quantized coefficients becomes the dominant influence on the rate controller. The scatter region of q values around the average q factor is much wider and the errors become so large and omnipresent among the macroblocks that the mathematically-derived error is no longer a good measure of quality, while the visual quality, i.e., the visibility of compression artifacts as a result of the errors, which is referred to as blocking and ringing, take over as the primary quality assessment criterion. The effect of initially assigning equal q values to each of the macroblocks leads to simple blocks being over-compressed, i.e. compressed much more than required based on their content. But because the rate controller focuses on adjusting the complex blocks, these over-compressed simple blocks are not improved, even though such improvement would only increase the compressed frame size very modestly. The over-compression of simple blocks does, however, create compression artifacts which are especially noticeable because the artifacts manifest as clearly visible 8×8 blocks.

Figure 4:
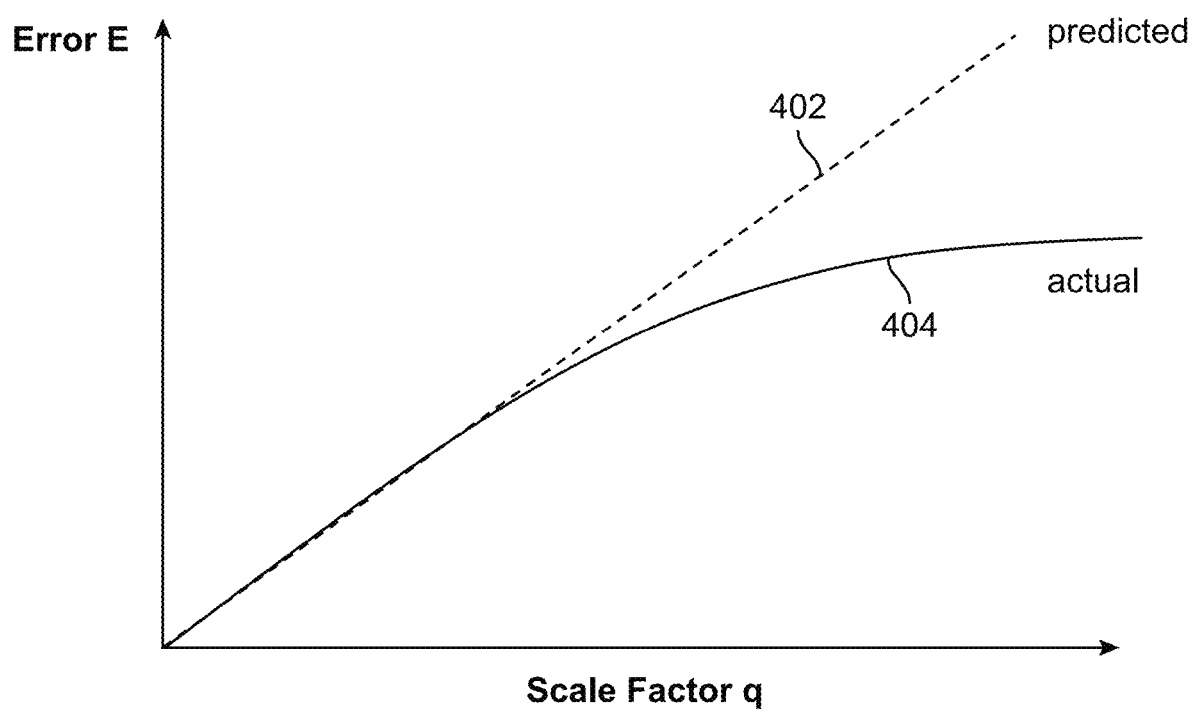
FIG. 4 is a graph comparing the actual compression-induced error with the predicted error used in traditional rate controllers as a function compression scale factor q.

The second pitfall arises from the way in which the traditional controller approximates the error. The control algorithm presumes that the error E is always proportional to q, as shown in FIG. 4, 402. While true for the small q values used for low compression ratios, the actual error falls well below proportionality at higher q values as shown in FIG. 4, 404 because once a coefficient has become zero as a result of the division by q, the error for this coefficient stops increasing. However, the error estimate approximated by the value of q implicitly assumes that all coefficients continue to contribute to the error as q increases. This discrepancy mainly affects low-to-medium-complexity blocks. Even before quantization these start with few non-zero coefficient values so that the contribution of these blocks to the overall error is grossly overestimated, especially for the larger q values needed for high compression ratios. This makes adjustments that improve these blocks appear far less attractive to the rate controller than they should. The first pitfall described above will lead to far worse quality on the simple blocks than could be achieved otherwise with practically no discernible change in visual quality in high complexity blocks. The end result of these pitfalls is to make the rate controller effectively "blind" to adjustments in low-complexity blocks for high compression ratios.

To overcome these pitfalls the rate controller described herein reverses the basic control paradigm into $$\text{Size} \xrightarrow{drives} \text{Quality}$$

Humans tend to focus on relevant portions of an image and sub-consciously ignore sections deemed less relevant. An encoder for high compression ratios should therefore focus on retaining good quality in relevant portions of the image (via low q factors), while it can be aggressive in compression (high q factors) in irrelevant portions or in visually noisy areas where additional compression-related noise is masked.

There are several ways of segmenting an image into relevant and irrelevant sections. One method determines the complexity of an image portion by assigning the same compressed size (bit cost) to each macroblock and then determining the q factor that is required to achieve this target. A visually simple block results in a low q factor, while visually complex blocks result in a high q factor. The resulting q factor can thus be used as the basis for categorizing the complexity of the macroblocks and then driving the rest of the rate controller based solely on this initial categorization.

This has several advantages compared to the RDO approach, in which the rate controller effectively tries to control a simple and 100% predictable entity (q) indirectly by adjusting the unpredictable compressed size in order to minimize the Σq. This forces the controller to make complex, multi-macroblock tradeoff decisions on hard to predict entities in order to get an overall better result on Σq. The new approach ignores the Σq and focuses on refining the predictable parameter q until it has met the overall bitrate budget from the starting point determined by the initial complexity categorization. To achieve this, the new approach only exploits the very general and generic traits (A) through (C) to manipulate the q factors and nudge the compressed size in the general direction of the target bitrate. This turns the complex multi-macroblock considerations of the RDO approach into simple, per macroblock (and thus parallelizable) adjustment decisions.

The principal steps of the fixed rate encoder that uses the rate controller described herein are as follows. The encoder receives the uncompressed image date (202), segments the image into macroblocks (204), and applies a DCT to transform the macroblock pixels into frequency coefficients (206). The rate controller then determines an initial bit budget per macroblock (208), and, in the assignment step (210), this constant compressed size is assigned to each MB. It then determines a value of q which results in a compressed size that falls just under the assigned size (210). This allows low-complexity blocks to retain a low compression ratio (low q), while forcing high-complexity blocks into high compression ratios (high q). In the analysis step (212), the macroblocks are sorted according to the determined q factor, ordering them from simple blocks with low q to complex blocks with high q. Then, in the adjustment step (214), the q factors are adjusted to rebalance the q distribution, maintaining their ordering according to complexity, as described in more detail below, until the target bitrate has been met. When one or more adjustments as described below have been performed, in quantization step 218, the adjusted scale factors are used to quantize the macroblock frequency coefficients. VLC encoding is then applied to the quantized frequency coefficients (220), and the fixed bitrate compressed video stream is output (222).

Figure 3:
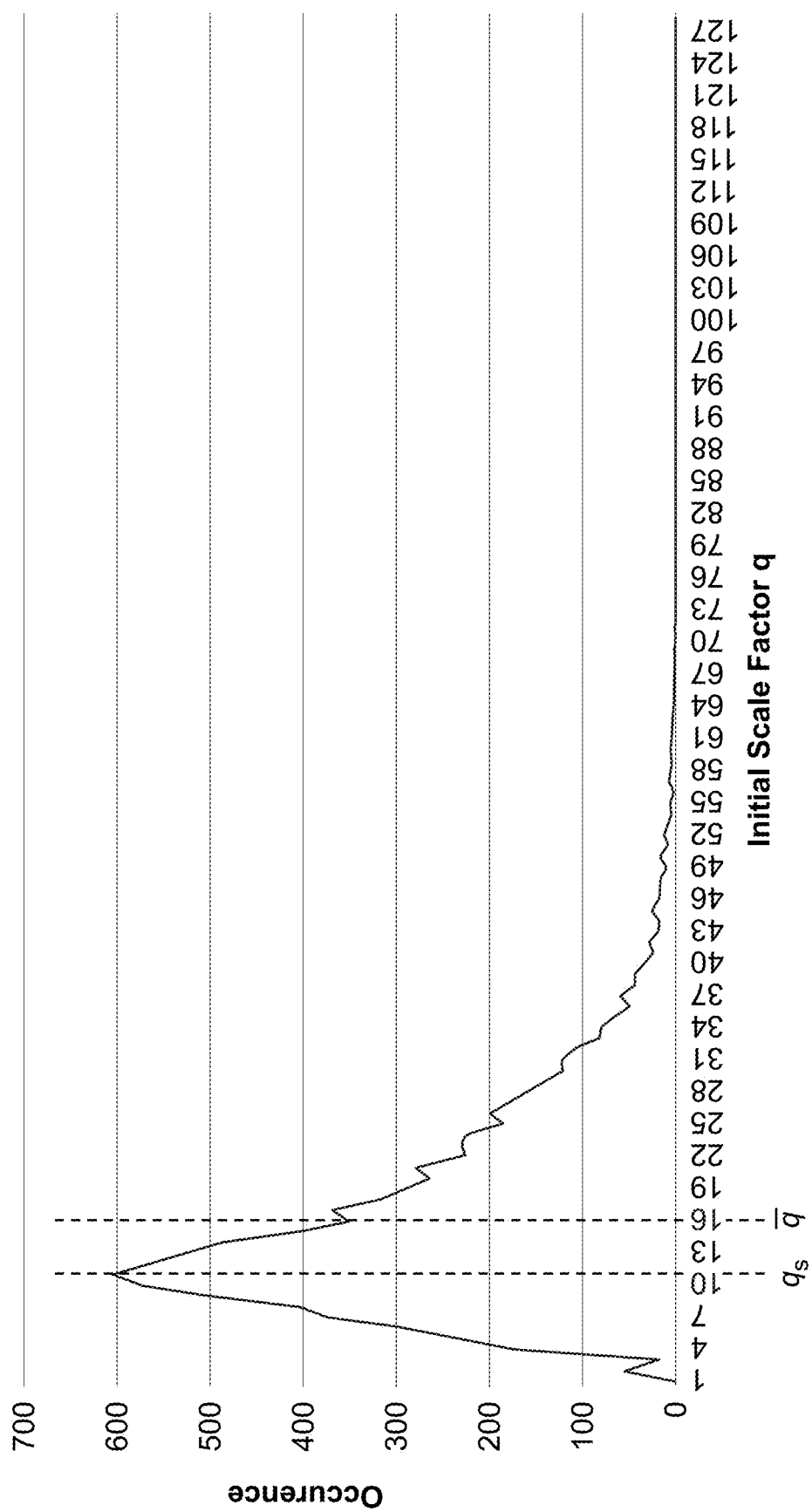
FIG. 3 is a graph showing a typical distribution of initial scale factors determined for the macroblocks of an image that approximate a constant compressed bit budget per macroblock.

FIG. 3 shows a typical distribution of the initial q factors. There is typically a single peak located at $q_s$, which generally marks the area where most of the blocks in the image fall initially based on the available bitrate. The distribution does not usually follow a Gaussian normal distribution at this stage, instead falling off sharply to the left of $q_s$ (towards simple blocks) while it trails out significantly to the right (more complex and eventually highly complex blocks). As a result, the average q factor $\bar{q}$ determined from this distribution is located to the right (above) of the peak $q_s$. During the adjustment step, the rate controller nudges the distribution towards a normal distribution, one macroblock at a time.

Blocks below $\bar{q}$ are already considered to have good visual quality, but further compression would generally degrade them to the point where artifacts could become visible. The general aim is not to adjust these blocks but to focus on significantly reducing the q factors above $\bar{q}$ to improve their visual quality while using the spare bitrate resulting from the undershoot generated during the analysis step.

Since all blocks have the same size, $\bar{q}$ is not only the average q factor of the distribution but also the "center of weight" of the block size distribution. After the analysis stage, exactly half of the target size is allocated to blocks at or below $\bar{q}$, and one half above. Adjusting the q factors shifts the q distribution towards a more balanced q distribution, i.e. moving $\bar{q} \to q_s$, but at the same time it creates an imbalance in the size distribution. Reducing the value of q moves $\bar{q} \to q_s$, but increases the size of the block, thus redistributing (compressed) size from low-complexity to high-complexity blocks. This also has the desired effect of reducing the overall mathematical error E, but it achieves this as an implied result of the adjustment stage without making it an explicit goal or control parameter. For low compression ratios the result of the visual-quality-based rate controller is therefore similar to that of the RDO approach.

If $q_s$ is not very high, i.e., below a value of about 16, increasing the q factor for simple blocks very slightly (e.g., by 1) does not typically result in a noticeable degradation of quality. This can be used by the rate controller to free up additional bitrate for downward adjustments for complex MBs. However, the rate controller remains conservative in these adjustments, as the general trait (C) indicates that there is little leeway to be gained without causing major damage to the visual quality of these blocks.

When adjusting the q factors of the blocks, the rate controller preserves the ranking established during the analysis step because this determines the relative priority for a block to be adjusted if free bitrate is still available.

The exact strategy used by the rate controller to peruse the free bitrate is flexible, provided it maintains the relative ranking of the macroblocks. The initial analysis usually provides a reasonable starting point so that the following adjustment steps generally lead to relatively minor incremental improvements in the visual quality of the encoded result.

Two considerations may affect the way the rate controller prioritizes the adjustment of blocks. First, at high compression ratios, some blocks, due to their extremely high complexity and the corresponding large q required to bring them into the macroblock bit cost range of the analysis range, may top out significantly at the upper end of the q range. The result of these very high q values is effectively that only the DC component (X(0,0)) survives the quantization and the entire 16×16 block becomes a monochromatic block embedded in a sea of neighboring high-complexity blocks that still show a lot of variation within the macroblock. If such a block is left uncorrected, it would stand out in the decompressed image. To address this, the first adjustment step of the rate controller brings down the top 5% (based on the 2 sigma approach if a normal distribution is used) of the q values, i.e., the upper tail end of the distribution, to the value at the 95% percentile. The adjustment keeps the block complexity ranking intact.

The second consideration arises from hard edges in an image. These are characterized by large jumps in luminance or chroma and can also lead to blocks being categorized as complex, though generally at a much lower q level (typically at or just below the $\bar{q}+\sigma$ level in the initial q distribution). An overly strong distortion in these areas would draw the viewer's attention as the human brain notices visible edges since they typically segment the environment into large-scale object boundaries. To address this issue, the rate controller reduces the q value of all macroblocks which reside at or above this level. It is usually preferable to make a relatively conservative adjustment per macroblock as this allows a greater number of macroblocks to be improved with the available bit budget.

These two considerations are usually so important for the overall quality that the rate controller may degrade some of the blocks around $\bar{q}$ slightly in order to gain the necessary bit budget leeway, should it run out of free bitrate before it can complete them. If there is still free bitrate available after these two adjustments, the rate controller can start to successively reduce q of all blocks above $\bar{q}$ slightly, thus distributing the available free bitrate evenly, and repeat this iteratively as often as there is free bitrate budget available.

As all of the individual adjustment steps are performed on macroblocks individually without any interlock with any other macroblocks except for the final acceptance of the adjustment based on the available bitrate, all bit cost evaluations (which account for 98% of the rate controller work) can be fully parallelized.

The rate controller described herein leads to a reduction of the average $\bar{q}$ for the distribution as it compacts the distribution downwards to lower values of q, focusing on the large q values. This causes the resulting $\Sigma q$ (respectively: the overall error E) of the final q distribution to be minimized or be reasonably close to a minimum. This means that for lower compression ratios the result also satisfies the "approximately minimal E" expectation, which is the objective of the RDO controller, thus producing very similar results.

Images compressed with the described rate controller are fully compatible with existing decoders for rate-distortion-optimization-based compressed images, specifically all the variants of the Avid DNx codec, including Avid DNx HD (high definition) and Avid DNx HR (high resolution). No change in the traditional compressed bitstream structure is required by the described controller. Other than the macroblock orientation and the target fixed bitrate, the algorithm does not require further codec-specific assumptions, with the result that it is, in general, applicable to all codecs that permit adjustments of the scale factor on a macroblock by macroblock basis.

Figure 5:
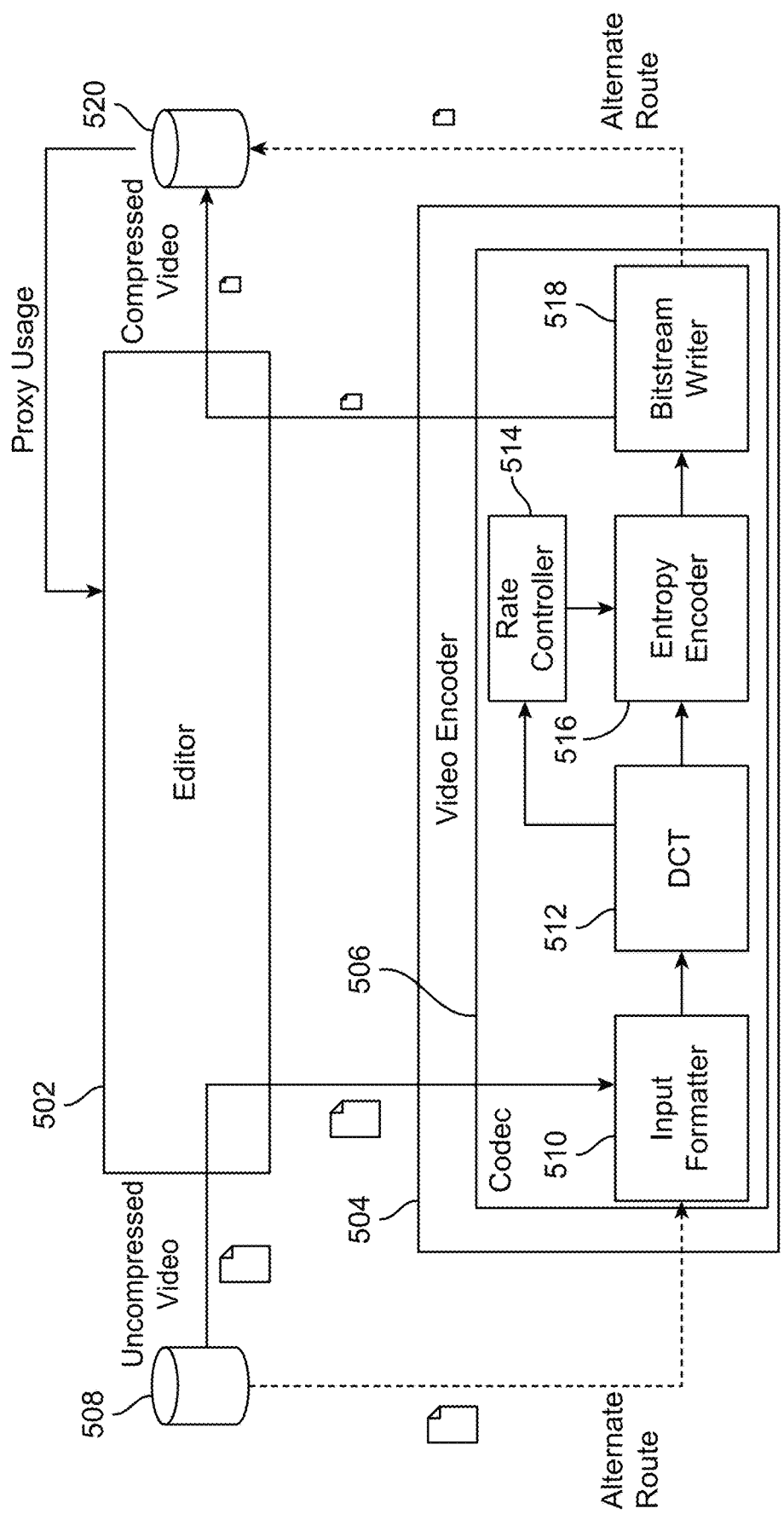
FIG. 5 is a high-level block diagram of a system and use case for implementing the described rate controller.

FIG. 5 is a high-level block diagram of a system and use case for implementing the described rate controller. Editor 502 comprises a software non-linear video editing application, such as Media Composer®, a product of Avid Technology, Inc., hosted on a computer system local to an editor or a remote system or the cloud. Video encoder 504 comprises software, hardware, firmware, or a combination that hosts codec 506 that performs the video compression methods described herein. The video encoder receives uncompressed video from storage 508, which may be local to the editor or remote. In various use cases, the uncompressed video is streamed directly to the editor from a live source, such as a video camera. The uncompressed video may first be received by the editor before being forwarded to the video encoder, or, alternatively, the video encoder may receive the uncompressed video directly from the source. The codec comprises input formatter module 510, DCT module 512, which converts blocks of the image data into frequency coefficients, rate controller module 514 and entropy encoder 516. The rate controller module tunes the compression as described above. It receives frequency coefficients from the DCT module and generates quantization scale factors that are applied to the frequency coefficients before they are subject to VLC encoding by the entropy encoder module. Essentially, the rate controller "tells" the entropy coder how to encode the values by providing the q factor for each MB. The entropy-encoded data is sent to bitstream writer module 518, from which the compressed video bitstream is sent back to the editor and on to storage 520 or directly to the storage. When a proxy video is needed for video editing purposes, the compressed video is retrieved from storage 520 and decompressed by a decoder (not shown), which may be implemented as a module within the editor or in a system external to the editor. The video editing application may then use the proxy video as part of the editing workflow.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for fixed bit rate, intraframe compression of video, including a sequence of images, comprising, for each image:
    segmenting the image into n portions, wherein compression parameters are individually adjustable for each of the n portions;
    transforming each of the portions of the image to generate frequency domain coefficients for each of the portions;
    selecting a stored quantization matrix for the image based on a desired bit rate for the compressed video;
    determining an initial bit budget per transformed portion of the image that is equal to a bit budget for the image within the compressed video divided by n;
    for each transformed portion, determining an initial scale factor that is the smallest scale factor that, when applied to the frequency domain coefficients together with the quantization matrix, results in a bit size of the transformed portion that is equal to or less than the initial bit budget per transformed portion; and
    generating a bitstream representing the compressed image by:
        for each transformed portion, scaling the portion's frequency domain coefficients by applying to the portion the initial scale factor determined for that portion together with the quantization matrix; and arranging the scaled frequency domain coefficients in a predetermined sequence and applying variable length coding to the sequence of scaled frequency domain coefficients.

2. The method of claim 1, further comprising:
ranking the transformed portions in order of their initial scale factors and determining an average of the initial scale factors;
proceeding in order of increasing initial scale factor, adjusting downward the initial scale factors of a plurality of transformed portions having initial scale factors greater than the average initial scale factor, wherein the amount of adjustment is a diminishing fraction of a difference between a given transformed portion's initial scale factor and the average initial scale factor; and
terminating the adjustment of initial scale factors when adjusting an additional transformed portion would result in a sum of bit sizes of the scaled transformed portions of the image exceeding a bit budget for the image within the compressed video.

3. The method of claim 2, further comprising:
prior to adjusting downward the initial scale factors of the plurality of transformed portions having initial scale factors greater than the average initial scale factor, for each portion having an initial scale factor below a threshold scale factor, adjusting upward the initial scale factor of the portion, wherein the threshold scale factor is based on the average initial scale factor and a standard deviation of the initial scale factors.

4. A computer program product comprising:
a non-transitory computer-readable medium with computer-readable instructions encoded thereon, wherein the computer-readable instructions, when processed by a processing device instruct the processing device to perform a method for fixed bit rate, intraframe compression of video, including a sequence of images, the method comprising, for each image:
  segmenting the image into n portions, wherein compression parameters are individually adjustable for each of the n portions;
  transforming each of the portions of the image to generate frequency domain coefficients for each of the portions;
  selecting a stored quantization matrix for the image based on a desired bit rate for the compressed video;
  determining an initial bit budget per transformed portion of the image that is equal to a bit budget for the image within the compressed video divided by n;
  for each transformed portion, determining an initial scale factor that is the smallest scale factor that, when applied to the frequency domain coefficients together with the quantization matrix, results in a bit size of the transformed portion that is equal to or less than the initial bit budget per transformed portion; and
  generating a bitstream representing the compressed image by:
    for each transformed portion, scaling the portion's frequency domain coefficients by applying to the portion the initial scale factor determined for that portion together with the quantization matrix; and
    arranging the scaled frequency domain coefficients in a predetermined sequence and applying variable length coding to the sequence of scaled frequency domain coefficients.

5. A system comprising:
a memory for storing computer-readable instructions; and
a processor connected to the memory, wherein the processor, when executing the computer-readable instructions, causes the system to perform a method for fixed bit rate, intraframe compression of video, including a sequence of images, the method comprising, for each image:
  segmenting the image into n portions, wherein compression parameters are individually adjustable for each of the n portions;
  transforming each of the portions of the image to generate frequency domain coefficients for each of the portions;
  selecting a stored quantization matrix for the image based on a desired bit rate for the compressed video;
  determining an initial bit budget per transformed portion of the image that is equal to a bit budget for the image within the compressed video divided by n;
  for each transformed portion, determining an initial scale factor that is the smallest scale factor that, when applied to the frequency domain coefficients together with the quantization matrix, results in a bit size of the transformed portion that is equal to or less than the initial bit budget per transformed portion; and
  generating a bitstream representing the compressed image by:
    for each transformed portion, scaling the portion's frequency domain coefficients by applying to the portion the initial scale factor determined for that portion together with the quantization matrix; and
    arranging the scaled frequency domain coefficients in a predetermined sequence and applying variable length coding to the sequence of scaled frequency domain coefficients.

* * * * *